(12) United States Patent
Cosman

(10) Patent No.: US 6,404,425 B1
(45) Date of Patent: Jun. 11, 2002

(54) SPAN-BASED MULTI-SAMPLE Z-BUFFER PIXEL PROCESSOR

(75) Inventor: Michael Cosman, South Jordan, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/228,146

(22) Filed: Jan. 11, 1999

(51) Int. Cl.7 .............................................. G06F 15/00
(52) U.S. Cl. ...................................................... 345/419
(58) Field of Search ................................ 345/418, 419, 345/420, 424, 426, 427, 589, 590, 591

(56) References Cited

U.S. PATENT DOCUMENTS

| 4,780,711 A | * 10/1988 | Doumas | 340/728 |
| 5,825,363 A | 10/1998 | Anderson | 345/422 |

FOREIGN PATENT DOCUMENTS

| EP | 0480570 A2 | 8/1991 |
| EP | 0489594 A2 | 12/1991 |
| GB | 2293079 A | 3/1996 |
| WO | WO 95/27267 | 10/1995 |

OTHER PUBLICATIONS

Carpenter, "The A–buffer, an Antialiased Hidden Surface Method", Computer Graphics vol. 18, No. 3, Jul. 1984.

* cited by examiner

*Primary Examiner*—Phu K. Nguyen
(74) *Attorney, Agent, or Firm*—Thorpe North & Western, LLP

(57) ABSTRACT

A method for creating a span-based multisample Z-buffer pixel processor in a computer graphics system to thereby reduce a quantity of data that must be stored for each pixel in a frame buffer thereof. By taking advantage of areal coherence, the quantity of data that must be stored in each pixel is reduced. By employing merging, the method is also able to ensure than pixel storage requirements do not grow beyond a predetermined limit.

36 Claims, 1 Drawing Sheet

SPAN-BASED MULTI-SAMPLE Z-BUFFER PIXEL PROCESSOR

BACKGROUND

1. The Field of the Invention

This invention relates generally to improving performance of a graphics system. Specifically, the cost of a pixel processor portion of a computer graphics system can be reduced by taking advantage of areal coherence to thereby reduce the amount of information that must be stored in each pixel. Merging is also utilized to ensure that pixel storage never grows beyond a set limit.

2. The State of the Art

The state of the art in pixel processing systems has progressed from an early state when a z-buffer engine stored a single polygon for each pixel. As each new polygon was processed, the engine first determined whether the old or the new polygon was closer to an observer's perspective. The polygon that was furthest away from the observer was discarded, and the nearer polygon was saved for rendering. In addition, edges and interpenetrations were quantized to whole pixels.

The resulting images exhibited several anomalies. These anomalies included stair-cases, crawling, and edge scintillation. Small polygons were even displayed intermittently, while thin polygons were often broken into disjointed segments.

In an effort to improve rendering using the z-buffer engine, modifications were made to the z-buffering process. For example, a multi-sample z-buffer engine was implemented so as to divide each pixel into several sub-pixels, each sub-pixel having an associated z depth and color triple. As each polygon was processed, the sub-pixel samples that were "won" were loaded with the polygon's color (which is constant across the pixel), and with its individual z depths that are unique to each sub-pixel sample.

Occultation of pixels was then decided at the sub-pixel level by comparing new and stored z depths. The winning sub-pixel was then saved with its associated color. A display video was then determined by averaging the color values for the sub-pixels within each pixel.

Multi-sampled z-buffer engines provided improved image quality. Disadvantageously, however, the improved image quality came at the expense of greatly increased pixel data storage. The pixel data storage was particularly expensive because the frame buffer for the storage must be implemented in comparatively slow DRAM memory, which becomes a system throughput bottleneck.

A simple calculation can easily demonstrate the typical memory requirements. A minimal data record for a sub-pixel sample might be 8 bits each of red, green and blue color data, and 16 bits of depth data. A system utilizing 4 sub-pixel multisampling would therefore require 4*40 bits for the samples, plus 24 bits for the display video (which would be 48 bits if using double-buffering), plus allowance for overlay/underlay planes and some record keeping.

An even more robust approach that would be suitable for flight simulation would require 12 bit color components and 32 bits of depth. This might result in approximately 400 bits of data per pixel when fully implemented.

These examples illustrate that a substantial quantity of memory is required using the four sub-pixel multisample z-buffer engine. However, four sub-pixels provide only marginal image quality. This is typically suitable for low-end applications and games. Higher-end system can employ 16 sub-pixel multisampling, thus requiring about 2000 bits of memory for storing data.

A recent architectural innovation, the adaptive multisampler, stores fragment information as polygon records within a pixel, rather than sub-samples. This approach cuts in half the required memory space and greatly improves the handling of transparent polygons. However, this system requires a heap storage mechanism. Consequently, there is a non-deterministic amount of frame-buffer read/write activity.

It would also be an advantage over the state of the art to also employ fragment merging to thereby avoid the need for a heap mechanism. This would provide the advantages of making frame-buffer read/write activity deterministic so that it can be fully parallelized.

When examining the state of the art, it is also useful to examine a slightly different approach to pixel processing. This alternative method utilizes an A-buffer. The A-buffer is a software-only rendering method. Briefly, it solves pixels by accumulating polygon fragment data, sorting by scene depth, merging "like" fragments, and weighting final pixel color by visible polygon fragment areas. This is similar in concept to the ultimate goals of improved pixel processing. However, the A-buffer's implementation has many disadvantages.

First, the A-buffer clips polygons to pixel boundaries and determines an area for each polygon/pixel fragment. This process is therefore computationally intensive. For example, the A-buffer uses both an area and a bit mask. This can also lead to subtle inconsistencies in overall pixel treatment. Furthermore, the A-buffer cannot accommodate overlapped/outrigger bit-mask strategies that fit more naturally into other strategies.

The A-buffer also utilizes a complex linked-list data structure to track polygon fragments within a pixel. The list must be traced to its conclusion, so processing is highly variable. Furthermore, the linked list can be randomly distributed throughout the memory address space, further hindering cache coherency and slowing memory access. It would be an advantage to utilize a data block of constant size, so that memory accesses are localized and deterministic.

The A-buffer also defers hidden surface removal until a final shade-resolve step. Accordingly, it must deal with many polygon fragments that may not ultimately contribute to the pixel color. It would be another advantage to erase sub-pixel portions of fragments as they are occulted by incoming new fragments. This make the associated memory available for re-use as early as possible in the rendering process.

The A-buffer also sorts fragments by front-most Z, and contains no information about the orientation of the fragment. It would by another advantage to store Z-slope information that enables full reconstruction of the fragment geometry. This method would lend itself well to multiple-pixel rendering areas without degradation.

The A-buffer must resort to an intersect/merge process when fragments are close in Z, even when they don't actually intersect. Therefore, it would be another advantage to increase sub-pixel occultation to a higher resolution. This would prevent hidden surfaces from "bleeding through" as occurs with the A-buffer where many polygons meet at a vertex.

The A-buffer also requires a significant amount of memory space. For example, the A-buffer needs 64 bits for a simple surrounder or for the first list pointer, and 192 bits for each additional fragment linked to a pixel. Accordingly, for an average depth complexity of 4, the A-buffer requires 832 bits per pixel, plus the final RGB (reg, green and blue) value. In contrast, it would be an advantage to reduce memory requirements to approximately 256 bits per pixel for the same depth complexity.

It would therefore be an improvement over the state of the art to take advantage of the improved image quality of the adaptive multisampler approach, while taking advantage of areal coherence to thereby reduce memory requirements.

OBJECTS AND SUMMARY OF THE INVENTION

It is an object of the present invention to provide a method for improved pixel processing by utilizing a span-based multisample z-buffer engine.

It is another object to utilize a span-based multisample z-buffer engine to thereby enable frame-buffer read/write activity to be deterministic.

It is another object to utilize a span-based multisample z-buffer engine which can be fully parallelized.

It is another object to utilize a span-based multisample z-buffer engine while taking advantage of areal coherence to thereby reduce memory requirements of the pixel processor.

It is another object to utilize fragment merging to thereby avoid the need for a heap mechanism.

The presently preferred embodiment of the present invention is a method for creating a span-based multisample Z-buffer pixel processor in a computer graphics system to thereby reduce a quantity of data that must be stored for each pixel in a frame buffer thereof. By taking advantage of areal coherence, the quantity of data that must be stored in each pixel is reduced. By employing merging, the method is also able to ensure that pixel storage requirements do not grow beyond a predetermined limit.

In a first aspect of the invention, each address within frame buffer memory is defined to correspond to a group of four pixels that are arranged as a contiguous 2×2 array. Data within each span record is associated with individual polygon fragments that are visible in one or more of the four pixels in a group.

In a second aspect of the invention, the pixel processor receives polygon fragments for each pixel. As new fragments are accumulated within a group of four pixels, it is possible that eventually there will be more data to write back to the frame buffer than there is space available. When this occurs, the system merges one or more pairs of polygon fragments until the data will fit, thus effectively limiting memory requirements.

In a third aspect of the invention, the accumulated polygon fragments can be resolved into display video for each of the four pixels in a group at any instant in time.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
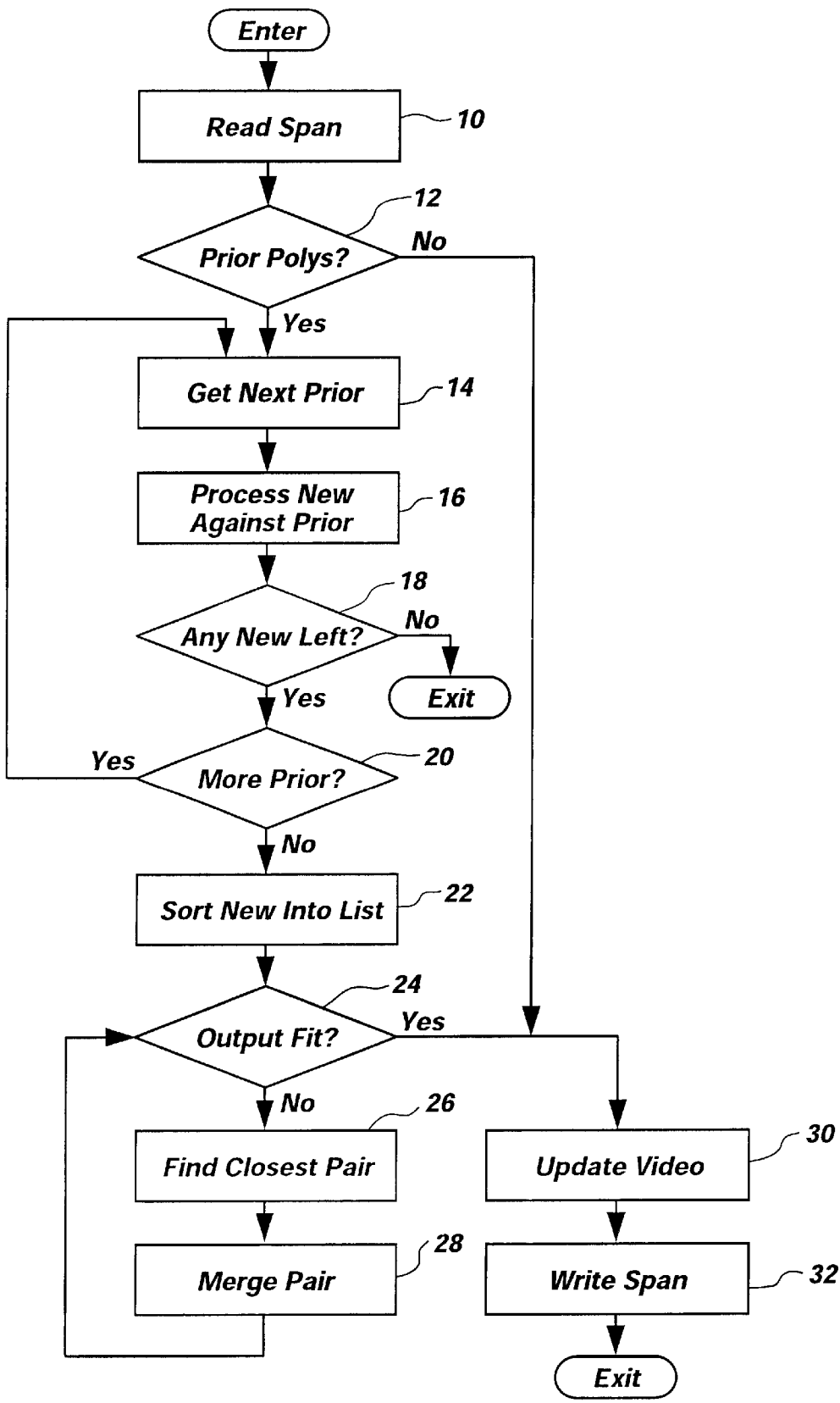
FIG. 1 is a flowchart describing the preferred embodiment that is constructed in accordance with the principles of the present invention.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It is useful to have an overview of the present invention before delving into the detailed description of the preferred embodiment. Accordingly, it is observed that the present invention advantageously reduces the cost of a pixel processor of a computer graphics system by using areal coherence to reduce the quantity of data that must be stored in each pixel. And when the amount of data to be stored exceeds the volume of the frame buffer memory, the present invention utilizes merging until the data is reduced to a manageable size defined as the memory capacity of the frame buffer.

The frame buffer serves a dual purpose in a computer graphics system. First, it is observed that the frame buffer stores information about each visible polygon as an image is built for rendering. Second, the frame buffer holds the resolved display video, defined as the red, green and blue values for each pixel to be rendered on a computer display.

In this invention, each address within the frame buffer is assigned to correspond to a group of four pixels. The group of four pixels is a contiguous 2×2 matrix, referred to as a span. The data within a span record is then associated with individual polygon fragments that are determined to be visible in one or more of the four pixels in a span.

The pixel processor receives as input polygon fragments for each pixel. The pixel processor resolves polygon fragment overlaps to determine which polygon is visible (also known as "surviving" or "winning"). The surviving polygon fragments are then stored for later consideration as an image to be rendered is built in the memory of the frame buffer.

Polygon fragments can be either opaque or transparent. Furthermore, they do not necessarily arrive in front-to-back order. Each polygon fragment includes information describing at least two properties. The first property is the polygon fragment's lateral screen extent (a "multisample mask" or sub-pixel sample matrix). The second property is depth behavior. The depth behavior is defined as a span center depth and depth slopes in a pixel line and element directions.

Each new polygon fragment is compared against all previously stored polygon fragments within a span. Portions of the new polygon that are hidden behind previous polygons are erased by clearing associated bits in an occultation mask. Portions of previous polygons that are behind the new polygon are also erased. If the new polygon is entirely erased by prior polygons, nothing new is written back into data stored in the spans. Furthermore, prior polygons that are now entirely erased are deleted from memory when span data is written back to the frame buffer.

As new polygon fragments are accumulated within a span, it is possible that eventually there will be more data to write back to the frame buffer than there is space available. When this occurs, the system will then merge one or more pairs of polygon fragments together until the amount of data to be stored will fit into the memory of the frame buffer.

It is observed that accumulated polygon fragments can be resolved into a display video which is the red, green and blue values for each of the four pixels in a span. This display video data can also be stored in the span record, or elsewhere. It is also observed that there is only one resolved shade (red, green and blue value) for each pixel, whereas there can be many polygon fragments that provide color information for each pixel.

It was explained previously that as polygons are processed, the "winning" sub-pixel samples are loaded with the polygon's color and individual z depths that are unique to each sub-pixel sample. Occultation of pixels was then decided at the sub-pixel level by comparing new and stored z depths. The winning sub-pixel was then saved with its associated color. The display video was then determined by averaging the color values for the sub-pixels within each pixel.

Perspective z (depth) is used when executing occultation processing because depth can be linearly interpolated in screen space. The depth at a span center is stored, along with depth slopes in a line and element directions. From these, the depth at each sample can be reconstructed when needed. This reduces the frame buffer storage requirements from one depth per sample, to one depth and two slopes per span. This memory reduction is about a factor if 12 relative to historical multisampling approaches, based on a 2×2 pixel span with 9 samples per pixel.

Occultation is thus resolved at the sample level, so edges of interpenetration are rendered with high quality. As needed, the sample depths for the new and previous polygons are reconstructed, compared, and then used to assign each sample to the proper polygon.

Transparency is resolved in a manner that is similar to the method used for the adaptive multisampler. Specifically, multiple transparent "owners" for each sample are enabled. The proper visual result is computed by processing transparent polygons in a front-to-back order. The presently preferred embodiment improves upon the method by properly solving the problem of interpenetrating transparent polygons by forcing a merge when interpenetration is detected. The merge function then properly resolves an edge of intersection so there are no "jaggies".

The preferred embodiment must also sort polygon records. Polygon records are sorted by depth within a span. This is done to facilitate proper resolution of transparency, and to support efficient merging when required to meet the frame buffer memory requirements. Each new polygon is assigned its proper place in a sorting list as it is processed, so the sort operation is largely "free".

It is useful to know that in an alternative embodiment, the sorting method can be made more extensive. For example, the sorting list can be made to consist of two sections. The first section includes all of the transparent polygons, sorted among themselves. The second section includes all of the opaque polygons, also sorted among themselves. This sorting approach is different from the adaptive multisampler, which does not require the opaque polygons to be sorted separately among themselves.

It is been determined though experimentation that slightly better results are obtained by sorting based on an "average" depth, rather than the depth at the span center. This computation is executed on-the-fly. However, the exact choice of sort criteria is irrelevant. Of course, where two polygons overlap, the polygon in front must come first in the either section of the sorted list.

Merging occurs when the system discovers that too much data must be written back to the frame buffer after processing a new polygon. Several merges may need to occur to get back within memory limits. Merge candidates are selected from polygons that are adjacent in the sorted list.

The first polygon (transparent or opaque) that are merged will be the two polygons closest in z depth. The merged result is then considered as a single polygon. If additional merges are needed, the system loops back to determine the next closest pair by z depth, and merges them.

The merged depth data is determined to be the weighted average of the depth data of the two selected polygons. The weighting factor for each polygon is the number of samples that each polygon wins in the span. The renormalization factor is then the sum of the number of samples assigned to the selected polygons, not the sum of the samples in a resultant sample mask. This is because if the selected polygons are transparent and they overlap, some samples will be counted twice, and must be divided out twice at a later time. The merged polygon sample mask is defined as a boolean "OR" of two input polygon masks.

The merging of color and transmittance data is a little more complex. The selected polygons may overlap, and in the overlap areas the color of a back polygon is attenuated by the transmittance of a front polygon. The front and back polygons may also interpenetrate. In this circumstance, portions of the front and the back polygons may be behind each other. The transmittance value through the overlapped portions is the product of the two transmittance values.

Bearing in mind that the merging of red, green, blue and transmittance occurs one pixel at a time, the steps are as follows. First, merging will take place between two polygons that will be referred to as a first polygon and a second polygon. Second, boolean operations on two sample masks are used to determine four non-overlapping regions within the pixel. The four regions are defined as the first polygon only, the second polygon only, the first polygon behind the second polygon, and the second polygon behind the first polygon. Third, sample counts associated with each of these four regions are determined and utilized to weight the merge process.

For example, let N1 be the samples for the first polygon, let N2 be the samples for the second polygon, let N12 be the samples for the first polygon being in front of the second polygon, and let N21 be the samples for the second polygon being in front of the first polygon. Let NT be the sum of N1+N2+N12+N21, which is the sample count for the boolean merge of the sample masks for the first polygon and the second polygon, and cannot exceed the number of samples in the pixel. Equation 1 shows that the merged transmittance is:

$$Tm = \frac{[T1*N1 + T2*N2 + T1*T2*(N12+N21)]}{NT}$$

Note that transmittance is a value between 0 (opaque) and 1 (invisible), so Tm will always be between T1 and T2.

The merged color is illustrated with the red component in Equation 2:

$$Rm = \frac{[R1*N1 + R2*N2 + R1*T2*N21 + R2*T1*N12]}{NT}$$

The merged color is illustrated with the green component in Equation 3:

$$Gm = \frac{[G1*N1 + G2*N2 + G1*T2*N21 + G2*T1*N12]}{NT}$$

The merged color is illustrated with the blue component in Equation 4:

$$Bm = \frac{[B1*N1 + B2*N2 + B1*T2*N21 + B2*T1*N12]}{NT}.$$

These computations in Equations 2, 3 and 4 can be rearranged to improve any particular implementation in hardware. Accordingly, their exact order is irrelevant.

Another observation about the merge process above is that it works properly for any combination of opaque and transparent polygons. If both the first and the second polygons are opaque, then T1 and T2 are both 0, as are N12 and N21. The presently preferred embodiment does not merge polygons where one is opaque and the other polygon is not, because the implicit reasoning in the merge process is that the first and second polygons somehow belong together, but this choice should not be considered critical or limiting to the present invention.

The present invention utilizes a data structure that is referred to as a span record. Polygon fragment data is stored in the span record, and organized for maximum flexibility in using the limited storage space of the frame buffer. Values that occur once in each span include a count for the number of currently stored polygon fragments, and the resolved display video for the four pixels of the corresponding span. Furthermore, this data might be double buffered to increase the speed of the graphics system.

Values that occur once for each polygon include the span-center depth value, the two depth slope values, and four bits that indicate which pixels in the span actually contain pieces of the polygon. For each of these bits that is set, there is a shade data block for a corresponding pixel that contains the color and transmittance values, and the pixel sample mask. Pixels which have no samples do not get assigned a shade data block, freeing up that space for use by other pixels and polygons.

The presently preferred embodiment stores polygon data blocks ascending from one end of the span record (immediately following the span data), and shade blocks descending from the other end of the span record. This enables the same storage area in the frame buffer to be used for either type of block, depending on the instantaneous conditions and needs.

In the presently preferred embodiment, RGB (red, green and blue) color components are stored as block-normalized values with 5 bits of red, 6 bits of green, 5 bits of blue, and 3 bits of exponent. These bits provide visual performance nearly equivalent to 12 bit color (required for high end applications), while saving appreciable storage space in the frame buffer.

It is important to recognize that the color components have been pre-multiplied by the polygon opacity prior to receipt by the pixel processor. This pseudo-float format will actually save on the total number of components required in a hardware implementation of the arithmetic computations required for merging and for video resolving. This aspect should be considered one of the points of novelty of the invention.

Transmittance (1-opacity) is a 6 bit value, sufficient to provide the appearance of a smoothly varying transparency. In addition, there are 9 sub-pixel sample bits, for a total of 36 sub-pixel sample bits per 2×2 span. It is now possible to determine that the shade data block is therefore 34 bits (the sum of 5+6+5+3+6+9 bits in the presently preferred embodiment).

Additional precision can be provided for transmittance, and more sub-pixel samples could be used. However, these are optional and not critical to the novelty of the invention.

Span center z depth is a floating point number with 15 bits of mantissa (plus a hidden bit) and 7 bits of exponent. Neither the mantissa nor the exponent needs a sign bit, since the depth values all lie between 0 and 1 (and are therefore always positive). The depth slopes are block-normalized short floating point numbers, with 6 bit signed mantissa, and a common signed 7 bit exponent. Four bits will be required to indicate the presence of shade data for each of the four pixels of the span. The result is that the polygon data block is thus 45 bits (the sum of 22+6+6+7+4 bits).

Four bits are required to designate the number of prior polygons stored in the span, and the block-normalized 5/6/5 bit color format (+3 bits for the exponent) for the double-buffered video for each of the four pixels in the span. Span level overhead is thus 156 bits (the sum of 4+2*4(5+6+5+3)).

If a total of 1024 bits for the span record are provided (which is equivalent to 256 bits per pixel), the span records can be utilized to provide the following combinations of polygon and shade data blocks:

1, 2, 3, or 4 polygons with 1 to 4 shade blocks each;
5 polygons and 5 to 18 shade blocks:
6 polygons and 6 to 17 shade blocks;
7 polygons and 7 to 16 shade blocks;
8 polygons and 8 to 13 shade blocks;
9 polygons and 9 to 13 shade blocks;
10 polygons and 10 to 12 shade blocks;

The maximum number of bits required of the 1024 bits available in the span record is only 1015, so there is some memory space available for changes in precision, etc. Note that 11 polygons only leaves room for 10 shade blocks, which is not a reasonable combination, because every polygon must get at least one shade block. On the other hand, if we only provide a total of 768 bits for the span record (192 bits per pixel), the following combinations are supportable in the presently preferred embodiment:

1, 2, or 3 polygons with 1 to 4 shade blocks each;
4 polygons and 4 to 12 shade blocks;
5 polygons and 5 to 11 shade blocks;
6 polygons and 6 to 10 shade blocks;
7 polygons and 7 or 8 shade blocks.

The example above requires a maximum of 766 of the 768 allocated bits. Note that the process and the hardware implementation thereof can be parameterized to allow for a continuous variation in the number of bits per span record. This feature enables appreciable modularity of system cost and performance.

FIG. 1 is provided as a summary of the method of the preferred embodiment of the present invention. For every new polygon fragment, the polygon fragment information and the span address are sent to the pixel processor. The span record is then read from memory into internal buffers in the pixel processor. The method as shown will now be described.

At the beginning of the method, it is important that a counter of prior polygons for every span is initialized to zero. The method then begins with step 10 which states that a span record of a new polygon is read by the pixel processor. If there are prior polygons as determined in step 12, each one is processed in turn beginning with step 14. However, if there are no prior polygons, the method skips directly to step 30, where the video is updated.

In step 14, a next prior polygon is pulled into memory. In step 16, the new polygon is compared to the next prior polygon. This comparison takes the form of depth information for the next prior polygon and the new polygon being used to determine which sub-pixel samples of each polygon are in front of the other. Losing samples of either polygon are cleared. Note that samples behind a transparent polygon are never cleared, since they are still visible.

During the processing of prior polygons, if all the samples of new polygons are eventually cleared, the system halts processing and immediately exits as shown in step 18. The existing information in the span record in DRAM is still valid, and nothing has changed that would require recomputation of the display video, so evaluation of the particular polygon/span fragment is complete. It is also possible that one or more of the next prior polygons will have all of their samples cleared. Subsequent processing will have to check for the existence of samples to determine whether the polygon still exists.

If there remain samples of the new polygon as determined in step 18, the method continues to step 20 to determine if there are more prior polygons. If there are, the method returns to step 14 for retrieval and processing. If there are no more prior polygons, then the method proceeds to step 22.

During the consideration of the new polygon versus the next prior polygons, the system determines where the new polygon should be entered into a sorted list in step 22. The new polygon is then inserted into the sorted list of polygon/span fragments.

In step 24, the system then determines how much storage space is needed to write the span record back to DRAM in its assigned location in step 24. If there is too much data, polygons are merged in step 26. There can be many criteria for selecting which polygons to merge. These criteria can include selecting adjacent polygons which have similarities in slope, etc. The important consideration is that the process is moved from an order $n^2$ selection problem where every polygon is compared to every other polygon, to an order n selection problem where each polygon is only compared to adjacent polygons.

The polygons located in step 26 are then merged in step 28. The system then recomputes the amount of storage space required in memory by returning to step 24. Merging continues until the result of step 24 is that the data will fit. It is noted that in the presently preferred embodiment, no more than three merges will be required to assimilate a new polygon fragment. During merging, the resulting polygon is left in the memory space occupied by one of the two merged polygons. The other polygon is nulled out by clearing its samples. It should also be recognized that the order in the sorted list of polygon/span fragments remains valid after merging. No resorting of data is required.

Once it is determined that the data will fit into the assigned memory location in DRAM, the display video is recomputed in step 30 and stored in step 32. The span record is written back to DRAM, and the system exits. Exiting means that the system is ready for the next polygon/span fragment that is input into the system. No data is written back for polygons that lost all their samples, either through occultation or merging.

Some observations regarding performance of the system can add insight into the operation of the presently preferred embodiment. For example, the underlying reasoning behind the method of the present invention is that even if the visual environment is processed in a random (rather than front-to-back) order, within any one span there will be relatively few polygon fragments, and these will tend to be clustered in z depth about the few "objects" to which they belong.

Where there are many polygon fragments within a span, each polygon fragment covers only a fraction of the span, and typically doesn't impinge upon all four pixels in the 2×2 matrix. If enough polygon fragments are accumulated before merging begins, there is a good chance of having good merge candidates (i.e. polygon fragments that belong together). Ideally, polygon fragments that are merged should be close enough so that it is unlikely that subsequent polygon fragments will be able to get between them in terms of z depth. If the polygon fragments really do belong together, they will also be likely to have similar shades. And finally, because average "depth complexity" of the image tends to be low (around 3 to 5), relatively few spans will have any merging at all.

Images generated by the pixel processor of the presently preferred embodiment confirm performance of the system. In a sample test sequence, a database consisted of eleven sets of four interpenetrating objects, plus a background terrain and a complex sky/ground model. The database polygons were processed in four passes of every fourth polygon in every model, so the order of encounter was pathologically not front-to-back, nor ordered by object. The image size was 128 by 96 spans, and there were nearly 39,000 polygons rendered. There were over 237,000 polygon/span fragments processed. Without merging, the scene required 58 polygon fragments per span, and 90 shade data blocks per span. There were a little over 11,000 first merges, about 2,000 second merges, and 56 third merges. The maximum difference in display video between the "perfect" image and the presently preferred embodiment was about 24% in a few pixels, and less than 12% in most pixels-about the same as a single sub-pixel sample of variation.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for creating a span-based multisample Z-buffer pixel processor in a computer graphics system to thereby reduce a quantity of data that must be stored for each pixel in a frame buffer thereof, said method comprising the steps of:

(1) assigning a span to be a group of at least four pixels disposed as a contiguous array, wherein each span is associated with at least one polygon fragment that is visible in at least one pixel of the span and stored in a data block of constant size;

(2) receiving polygon fragments for each span at the pixel processor;

(3) determining which polygon fragments are visible in each span; and (4) storing the visible polygon fragments in each span back to the frame buffer for rendering into a video display.

2. The method as defined in claim 1 wherein the method further comprises the step of assigning the span to be a contiguous array of pixels which form a matrix having an equal number of rows and columns, to thereby take advantage of areal coherence.

3. The method as defined in claim 1 wherein the method further comprises the step of assigning the span to be a contiguous 2×2 array of four pixels.

4. The method as defined in claim 1 wherein the method further comprises the step of processing polygon fragments that are opaque, transparent, and transitioning therebetween to thereby determine proper display characteristics for the pixels.

5. The method as defined in claim 1 wherein the method further comprises the step of receiving the polygon fragments in any order to thereby process all the polygon fragments regardless of an order in which they are sent to the pixel processor.

6. The method as defined in claim 1 wherein the method further comprises the step of comparing each new polygon fragment against all previously stored polygon fragments within a span to thereby determine which of the new polygon fragments and which of the previously stored polygon fragments are visible and which are hidden.

7. The method as defined in claim 6 wherein the method further comprises the step of erasing portions of the new polygon fragment that are hidden behind any part of the previously stored polygon fragments.

8. The method as defined in claim 7 wherein the method further comprises the step of erasing portions of the new polygon fragment that are hidden behind any part of the previously stored polygon fragments by clearing associated data bits in an occultation mask.

9. The method as defined in claim 8 wherein the method further comprises the step of erasing portions of the previously stored polygon fragments that are determined to be disposed behind the new polygon fragment.

10. The method as defined in claim 9 wherein the method further comprises the step of erasing portions of the previously stored polygon fragments that are determined to be disposed behind the new polygon fragment by deleting the portions of the previously stored polygon fragments when span data is written back to the frame buffer.

11. The method as defined in claim 7 wherein the method further comprises the step of writing no new data back to the frame buffer if the new polygon is completely hidden behind the previously stored polygon fragments.

12. The method as defined in claim 1 wherein the method further comprises the steps of:
(1) generating an amount of span data that is greater than available memory space within the frame buffer; and
(2) processing the span data so that said span data will fit within available memory space of the frame buffer.

13. The method as defined in claim 12 wherein the method further comprises the step of processing the span data so as to fit within the available memory of the frame buffer by merging at least one pair of polygon fragments until the span data is smaller than the available memory space of the frame buffer.

14. The method as defined in claim 13 wherein the method further comprises the steps of:
(1) sorting the polygon fragments in a sort list within the span to thereby at least facilitate proper resolution of transparency and to support efficient merging; and
(2) selecting merge candidates from interpenetrating polygon fragments in the sort list.

15. The method as defined in claim 13 wherein the method further comprises the steps of:
(1) sorting the polygon fragments within the span in a sort list to thereby at least facilitate proper resolution of transparency and to support efficient merging; and
(2) selecting merge candidates from the polygon fragments which are adjacent in the sort list.

16. The method as defined in claim 15 wherein the method further comprises the step of selecting the merge candidates from the polygon fragments in accordance with an order n selection criteria whereby adjacent polygons are compared, wherein the merged polygon fragments are then considered as a single polygon fragment which maintains a same position within the sort list.

17. The method as defined in claim 16 wherein the method further comprises the steps of:
(1) determining if the span data will fit within the available memory space of the frame buffer after merging the at least one pair of polygon fragments;
(2) selecting a next suitable pair of polygon fragments in accordance with the order n selection criteria whereby adjacent polygons within the sort list are compared if the span data will not fit within the available memory space;
(3) merging the next suitable pair of polygon fragments; and
(4) repeating steps (1) through (3) until the span data is smaller than the available memory space of the frame buffer.

18. The method as defined in claim 13 wherein the method further comprises the steps of:
(1) sorting the polygon fragments within the span in a sort list as determined by adjacency to thereby at least facilitate proper resolution of transparency and to support efficient merging; and
(2) selecting merge candidates from the polygon fragments which are adjacent in the sort list.

19. The method as defined in claim 13 wherein the method further comprises the step of dividing the sort list into two separate categories of polygon fragments, (1) a plurality of transparent polygons that are sorted among themselves, and (2) a plurality of opaque polygons that are sorted among themselves.

20. The method as defined in claim 19 wherein the method further comprises the steps of:
(1) sorting the polygons by placing a first polygon ahead of a second polygon on the sort list when the first polygon overlaps the second polygon; and
(2) if the first polygon does not overlap and is not overlapped by the second polygon, sorting the polygons relative to an average z depth.

21. The method as defined in claim 13 wherein the method further comprises the step of merging the at least one pair of polygon fragments relative to a weighted average of a depth thereof.

22. The method as defined in claim 21 wherein the method further comprises the step of defining the weighted average of the pair of polygon fragments as a total number of samples each polygon fragment wins in the span.

23. The method as defined in claim 22 wherein the method further comprises the step of defining a renormalization factor as a sum of the total number of samples assigned to the pair of polygon fragments.

24. The method as defined in claim 13 wherein the method further comprises the step of accounting for color, transmittance, and interpenetration of the pair of polygon fragments, one pixel at a time.

25. The method as defined in claim 24 wherein the method further comprises the steps of:
(1) generating a sample mask for each of the pair of polygon fragments to be merged;
(2) determining four regions within the pixel which are defined as a first polygon only, a second polygon only, the first polygon behind the second polygon, and the second polygon behind the first polygon;
(3) determining a total number of sample counts associated with each of the four regions; and
(4) determining the weighted average using the total number of sample counts.

26. The method as defined in claim 25 wherein the method further comprises the step of determining a merged transmittance value as:

$$Tm = \frac{[T1*N1 + T2*N2 + T1*T2*(N12 + N21)]}{NT}$$

where N1 is a total number of samples for the first polygon, where N2 is a total number of samples for the second polygon, where N12 is a total number of samples where the first polygon is in front the second polygon, where N21 is a total number of samples where the second polygon is in front of the first polygon, where T1 is a transmittance value of the first polygon, where T2 is a transmittance value of the second polygon, and where NT=N1+N2+N12+N21.

27. The method as defined in claim 26 wherein the method further comprises the step of determining a merged red color value as:

$$Rm = \frac{[R1*N1 + R2*N2 + R1*T2*N21 + R2*T1*N12]}{NT}$$

where R1 is a red component of the first polygon, and where R2 is a red component of the second polygon.

28. The method as defined in claim 26 wherein the method further comprises the step of determining a merged green color value as:

$$Gm = \frac{[G1*N1 + G2*N2 + G1*T2*N21 + G2*T1*N12]}{NT}$$

where G1 is a green component of the first polygon, and where G2 is a green component of the second polygon.

29. The method as defined in claim 26 wherein the method further comprises the step of determining a merged blue color value as:

$$Bm = \frac{[B1*N1 + B2*N2 + B1*T2*N21 + B2*T1*N12]}{NT}$$

where B1 is a blue component of the first polygon, and where B2 is a blue component of the second polygon.

30. The method as defined in claim 24 wherein the method further comprises the step of forcing a merge when a pair of transparent polygon fragments are determined to be interpenetrating to thereby eliminate aliased pixels at an edge of intersection of the pair of polygon fragments.

31. The method as defined in claim 1 wherein the method further comprises the step of defining a span record for storing polygon fragment data as including (1) a count of a total number of currently stored polygon fragments, and (2) a resolved display video for the pixels of the span.

32. The method as defined in claim 31 wherein the method further comprises the step of defining a data record for each polygon fragment which includes (1) a span center depth value, (2) two depth slope values, and (3) a plurality of flag bits which indicate which pixels in the span actually contain a portion of the polygon fragment.

33. The method as defined in claim 32 wherein the method further comprises the step of defining a shade data block which corresponds to a set flag of the plurality of flag bits, wherein the shade data block includes (1) a color value, (2) a transmittance value, and (3) a pixel sample mask.

34. The method as defined in claim 1 wherein the method further comprises the step of including within each of the polygon fragments data regarding a lateral screen extent and a depth behavior.

35. The method as defined in claim 34 wherein the method further comprises the step of including a multisample mask as a portion of the lateral screen extent.

36. The method as defined in claim 35 wherein the method further comprises the step of including a span center depth and depth slopes in a pixel line and element directions as at least a portion of the depth behavior.

* * * * *